United States Patent [19]

Byrd et al.

[11] Patent Number: 5,423,032
[45] Date of Patent: Jun. 6, 1995

[54] METHOD FOR EXTRACTING MULTI-WORD TECHNICAL TERMS FROM TEXT

[75] Inventors: Roy J. Byrd, Ossining; John S. Justeson, Poughkeepsie, both of N.Y.; Slava M. Katz, Westport, Conn.

[73] Assignee: International Business Machines Corporation, Armonk, N.Y.

[21] Appl. No.: 816,908

[22] Filed: Jan. 3, 1992

Related U.S. Application Data

[63] Continuation-in-part of Ser. No. 785,641, Oct. 31, 1991.

[51] Int. Cl.⁶ .............................................. G06F 17/30
[52] U.S. Cl. ................................. 395/600; 395/934; 364/943.41; 364/943.42; 364/974
[58] Field of Search ................. 395/600, 700, 934, 51, 395/144; 364/943.41, 974, 282.1, 943.42

[56] References Cited

U.S. PATENT DOCUMENTS

| | | | |
|---|---|---|---|
| 4,241,402 | 12/1980 | Mayper, Jr. et al. | 364/200 |
| 4,420,816 | 12/1983 | Yoshida | 395/144 |
| 4,823,306 | 4/1989 | Barbic et al. | 364/900 |
| 4,916,655 | 4/1990 | Ohsone et al. | 395/600 |
| 4,972,349 | 11/1990 | Kleinberger | 364/900 |
| 5,005,127 | 4/1991 | Kugimiya et al. | 395/144 |
| 5,228,133 | 7/1993 | Oppedahl | 395/425 |
| 5,303,361 | 4/1994 | Colwell et al. | 395/425 |

OTHER PUBLICATIONS

"APS Text Search and Retrieval Classroom Manual", The Planning Research Corporation, Jun. 1989, pp. 2-5 to 2-39, 3-4 and B2-5.

*Primary Examiner*—Kevin A. Kriess
*Assistant Examiner*—Dennis M. Butler
*Attorney, Agent, or Firm*—Roy Schlemmer, Jr.; Douglas W. Cameron; Ronald L. Drumheller

[57] ABSTRACT

A method and apparatus for extracting multi-word technical terms from a text file in a computer system. Word strings are selected from the text that have at least two words, that have at most a specified maximum number of words, that include none of a special set of selected tokens, and that only include selected characters. Word string which occur less than a specified minimum number of times in the text file are deleted. The remaining strings form a set of word strings very likely to be multi-word technical terms. Improvements on the quality of the set of word strings can be accomplished by deleting word strings which do not satisfy certain grammatical constraints.

28 Claims, 2 Drawing Sheets

METHOD FOR EXTRACTING MULTI-WORD TECHNICAL TERMS FROM TEXT

CROSS-REFERENCE TO RELATED APPLICATION

This application is a continuation-in-part of co-pending application Ser. No. 07/785,641 filed Oct. 31, 1991, the priority of which is retained.

DESCRIPTION

Technical Field

This invention relates to a method and apparatus for extracting multi-word technical terms from a text file in a computer system. More specifically, a set of word strings satisfying specific constraints is created which consists primarily of multi-word technical terms.

BACKGROUND OF THE INVENTION

Automatic extraction of terminology from text is important for a variety of activities that involve process of natural language. It is an especially pressing need for the writers and translators of technical manuals, for whom it can help maintain the consistency and correctness of translation and usage and decrease the cost of their activities.

Among the uses to which the identification of technical terminology can be put are the following:

The identification of terms requiring translations in a bilingual terminology dictionary for humans or in the automated dictionaries of a computerized natural language translation system.

The identification of new terms requiring definition in a glossary of a technical document or in a dictionary;

The identification of the terms in a text document which should be used for indexing that document in a computerized information retrieval system.

The identification of domain-specific concepts in a domain for use in a knowledge-representation system that models that domain.

The identification of additional entries for lexicons for natural language parsers in order to improve the performance of those parsers for a variety of applications.

The identification of terms to be used in algorithms for determining the topic of a text document.

A Technical term is a word string that has a particular meaning in a domain. A multi-word technical term is a term that consists of more than one word. A technical term can be a common noun phrase such as "central processing unit"10 or "market share". It may also be a proper noun phrase such as "United States Patent Office" or "New York Stock Exchange".

U.S. Pat. No. 4,566,295 to K. Toth describes an improvement in stenographic systems using word frequencies.

U.S. Pat. No. 4,625,295 to J. T. Skinner describes a hardware means for locating predefined characters, words, or combinations of words.

U.S. Pat. No. 4,744,050 to Hirosawa et al describes a method of determining the most frequently used phrases in a text, while this invention is concerned with noun phrases that occur more than once in a text.

U.S. Pat. No. 4,813,010 to T. Okamoto et al deals with the extraction of hierchical structure in a document as indicated by section headings. Word, phrase, and symbol frequencies are used, with higher frequency forms being preferred candidates for inclusion in headings. Okamoto uses actual frequency information rather than simple repetition information as with the invention of this application. Simple repetition information is only information as to whether a word string appears a minimum number of times in a text file.

U.S. Pat. No. 4,868,750 to Kucera et al describes a means for determining grammatical tags for sequences of words in text. Kucera is concerned with a method of grammatical tagging, while the applicants' invention merely uses grammatical tagging. Applicants' invention could use the grammatical tagging of Kucera; however, his tagging method is not preferred.

U.S. Pat. No. 4,888,730 to McRae et al teaches replacing frequently used words with their synonyms.

SUMMARY OF THE INVENTION

It is therefore an object of this invention to provide a method and apparatus for extracting multi-word technical terms from text with minimal cost.

It is another object of this invention to automatically extract multi-word technical terms from a text file in a computer system with a high rate of coverage and high quality. Coverage refers to the percentage of actual multi-word technical terms that are extracted from a given file while quality refers to the percentage of extracted strings that are actually multi-word technical terms.

Accordingly, this invention provides a method and apparatus for extracting multi-word technical terms in a text file in a computer system. With this invention word strings are selected from a text file with each word string having at least two words and at most a specified maximum number of words. The word strings are also selected so as to satisfy at least one of the following three types of constraints: frequency, token, and grammar. The frequency constraint refers to the number of times that a word string appears in a file. The token constraint refers to the property that a word string cannot have a word which belongs to a selected set of words. This selected set need not be a finite list of words, but can include tokens which have characters other than members of a selected set of allowable characters. Finally, satisfaction of grammar constraints would require selected potential parts of speech to appear in selected positions of a word string. For example, one such grammatical constraint would be to require a that word string end with a potential noun.

The quality of the resulting list of word strings can be further improved by requiring not only one type of constraint, but two or all three of the constraints to be satisfied. Specifically, the word strings are intended to be noun phrases that consist only of adjectives (other than quantifiers or determiners) and nouns (other than pronouns or quantifiers used as nouns) and that end in a noun, or that consist of two such noun phrases joined by a preposition.

DESCRIPTION OF THE PREFERRED EMBODIMENT

Figure 1:
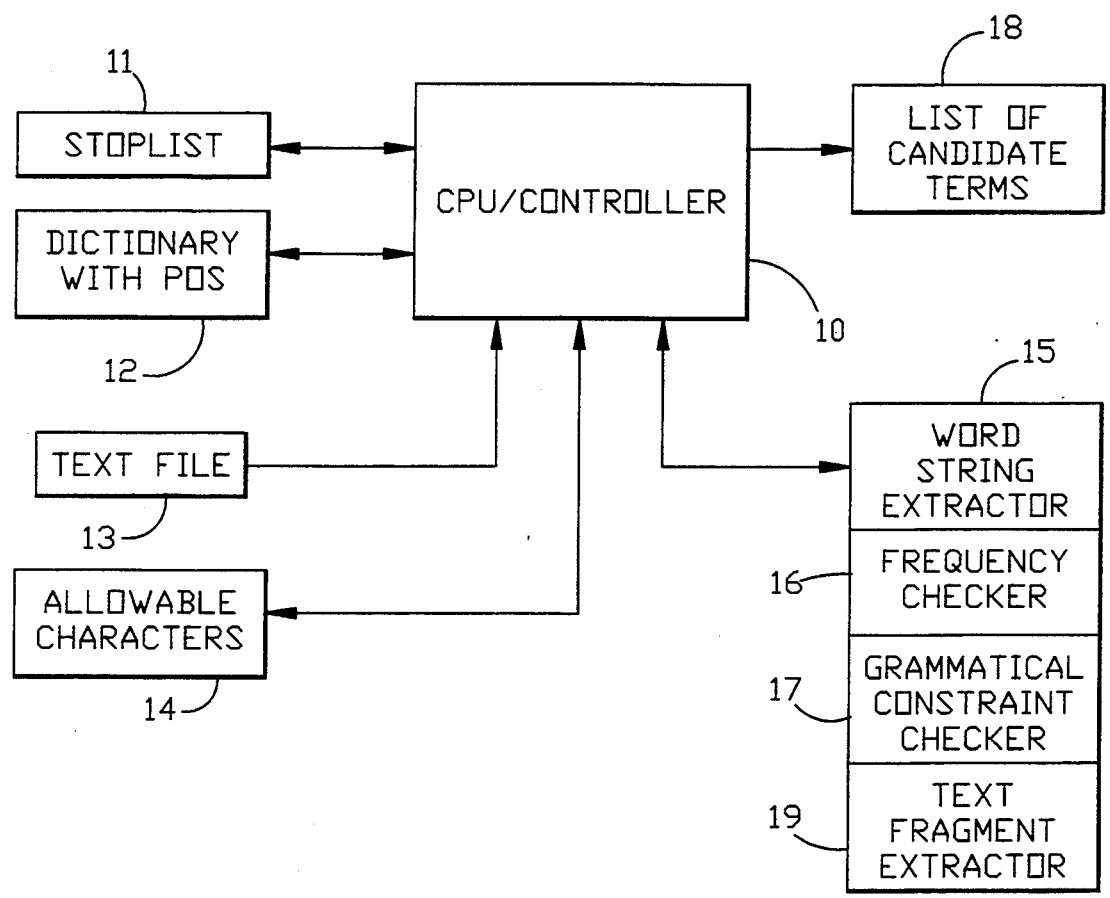
FIG. 1 schematically illustrates the various components of the Invention with the text file as the input and the candidate multi-word technical terms as the output.

FIG. 1 shows the invention to be an apparatus (10) which accepts, as input, a text file (13) and produces, as output, a list of candidate technical terms (18). The operation of the apparatus is controlled by a set of parameters, including a stoplist (11), a list of allowable characters (14) and a dictionary containing words' parts of speech (12). The apparatus is made up of sub-modules which include a text fragment extractor (19), a word string extractor (15), a frequency checker (16), and a grammatical constraint checker (17).

Figure 2:
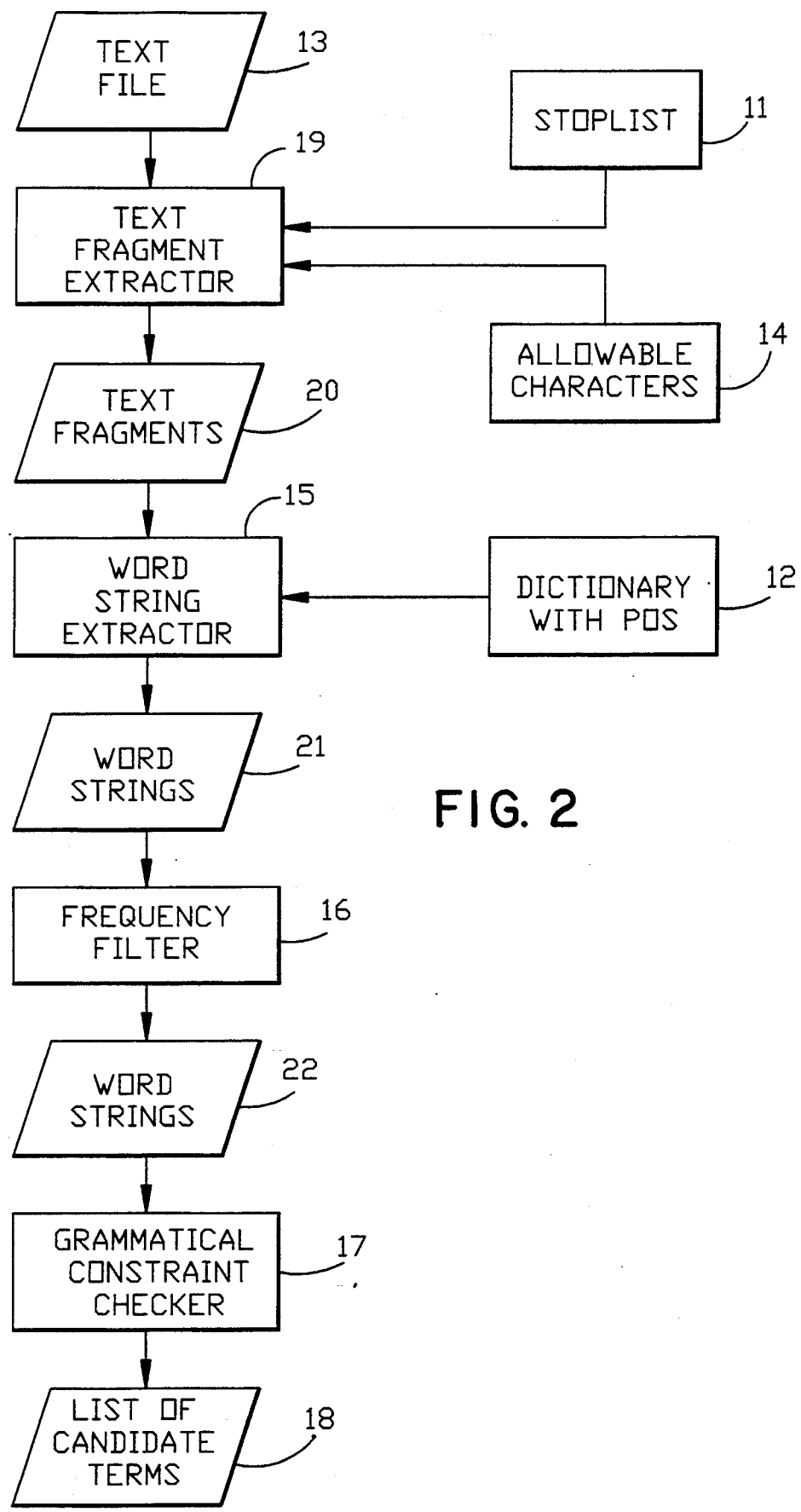
FIG. 2 schematically illustrates the steps necessary to extract a list of candidate multi-word technical terms from a text file.

FIG. 2 shows the steps involved in extracting a list of candidate terms (18) from a text file (13), in the preferred embodiment. The text fragment extractor (19) produces text fragments (20) which are passed through a word string extractor (15), to produce a list of word strings (21). The text fragment extractor produces fragments that are the maximal strings of consecutive words from the text file that contain only allowable characters (14) and that contain no words from the stoplist (11). The text fragments are passed to the word string extractor one at a time, as said text fragments are produced from the text file. Word strings are produced from these fragments by selecting all substrings of at least 2 and at most a specified maximum number of words whose last word has a noun entry in the dictionary of parts of speech (12). The word strings produced from these fragments are accumulated in the word string list (21), and control passes back to the text fragment extractor (19) until the text file is exhausted. The word string list (21) is then passed to the frequency filter (16), which produces an intermediate list of word strings (22) which the grammatical constraints checker (17) converts into the final list of candidate terms (18) by eliminating those word strings that do not satisfy the grammatical constraints. The various filters and checkers may be applied in sequences different than the one shown here. These filters and checkers may also be applied simultaneously, thus reducing the number of intermediate word string lists.

The basic idea behind this invention is to extract a set of word strings that is very likely to contain a high proportion of the multi-word technical terms in a text file in a computer system.

PSEUDO-CODE FOR PREFERRED EMBODIMENT

Input to the program consists of a text file text_file. Parameters are max_length, the maximum number of words permitted in a candidate term; min_count, the minimum frequency a candidate word string must have to be accepted as a candidate term; allow_preposition, which is true if prepositions are to be allowed in candidate terms, and which is false otherwise; lemmatize, which is true if all candidate word strings are to be normalized to singular form, false if singular and plurals are both to be listed; and no_spec_chars which is true if non-allowable characters are to be prohibited in candidate terms and false otherwise. The default values for there parameters are 5 for max_length, 2 for min_count, true for allow_preposition, false for lemmatize, and true for no_spec_chars. The notation s[n,l] indicates a substring of the string s, consisting of l consecutive words being at the nth word of s.

The main procedure is names terms. This program calls three procedures for which pseudo-code is provided: substrings, frequency_constraint and grammar_constraints.

Other functions called by these procedures, and assumed to be part of the computing environment, are: length, the number of characters in a string; member, which returns true if the first argument occurs in a list, which list is its second argument, and false otherwise; only_contains, which returns true if all characters in a string which is the first argument are contained in a list of characters which is the second argument, and false otherwise; concatenate, which creates a string by joining the two argument strings with a blank character between them; min, which returns the smallest of its arguments; max, which returns the largest of tis arguments; part_of_speech, which returns a list of all the parts of speech listed for its argument in the part-of-speech dictionary, and noun if the argument is not in the dictionary; singular, which returns a singular form for a noun argument; sort, which arranges the elements of a list in alphabetical order; next_record, which returns the next record of the list; and tail, which returns the argument string but with its first token removed.

```
begin terms(max_length, min_count, allow_preposition, lemmatize, no_spec_chars):
    if max_length = " then max_length:= 5
    if min_count = " then min_count:= 2
    if allow_preposition = " then allow_preposition:= true
    if lemmatize = " then lemmatize:= false
    if no_spec_chars = " then no_spec_chars:= true
    word_string_list:= "
    s:= text_file
    current_fragment:= "
    for i from 1 to length(s) {
        w:= s[i, 1]
        if member(w, stoplist)|(no_spec_chars &   only_contains(w, allowable_chars)) then {
            if length(current_fragment)>1 then substrings(current_fragment, max_length, lemmatize)
            current_fragment:= "
        } end if
        else current_fragment:= concatenate(current_fragment, w)
    } end for loop
    if length(currrent_fragment)>1 then substrings(current_fragment, max_length, lemmatize)
    word_string_list:= frequency_constraint(word_string_list, min_count)
    candidate_list:= grammar_constraints(word_string_list, allow_preposition)
    end terms
begin substrings(f, max_length, lemmatize):
    for l from 2 to min(max_length, length(f)) {
        w = f[l,1]
        if member('noun', part_of_speech(w)) then iterate
```

```
        if lemmatize then }
            w:= singular(w)
            f:= concatenate(f[1, 1 − 1], w)
        } end of if lemmatize
        for i from max(1, 1 − max_length + 1) to 1− 1 {
            write f[i, 1−i+1] to word_string_list
        } end of inner for loop
    } end of outer for loop
    end substrings
begin frequency_constraint(list, min_count):
    list: = sort(list)
    old_r: = "
    count:= 0
    out_list:= 0
    while (list not empty) {
        r:= next_record(list)
        if r = old_then count:= count + 1
        else {
            if count≧min_count then write concatenate(count, old_r) to out_list
            count:= 1
            old_r:= r
        } end of else
    } end of while loop
    return(out_list)
    end frequency_constraint
begin grammar_constraints(list, allow_preposition, lemmatize):
    while (list not empty) {
        r:= next_record(list)
        s:= tail(r) / remove string's frequency from front of string /
        l:= length(s)
        no_preposition:= allow_preposition
        constraints_satisfied:= true
        for i from 1 to l−1 while (constraints_satisfied) {
            w:= s[i, 1]
            if member('noun', part_of_speech(w)) then iterate
            if member('adj', part_of_speech(w)) then iterate
            if i>1 & no_preposition & member('prep', part_of_speech(w)) then {
                no_preposition:= false
                w:= s[i−1, 1]
                if member('noun', part_of_speech(w)) then iterate
            } end of if
            constraints_satisfied:= false
        } end of for loop
        if constraints_satisfied then write r to out_list
    } end of while loop
    return(out_list)
    end grammar_constraints
    stoplist:=
    / quantifier and determiner adjectives and nouns /
        a all an another any both each either enough entire every following
        her his its my one's only our own preceding previous same several
        some sometime subsequent such that the your
        0 1 2 3 4 5 6 7 8 9 one two three four five six seven eight nine ten
        eleven twelve thirteen fourteen fifteen sixteen seventeen eighteen nineteen
        twenty thirty forty fifty sixty seventy eighty ninety hundred thousand million billion trillion
    / frequent words that are only rarely full nouns, full adjectives, or preposition /
        altogether am as away back being but can do does doing done get gets
        getting goes going gone got gotten have having here if like liked
        likes liking made make makes making may might mine must now once or
        otherwise preceding said saw say saying says se seeing sees so somebody
        someplace something somewhere still than then there therefore twice
        willing
    / frequent tokens that are never full nouns, full adjectives, or preposition /
        ,.;:!?..."0[]{}<>
        again and are aren't be been can't cannot could couldn't did
        didn't doesn't don't few go had hadn't has hasn't haven't
        he he'd he'll he's hers hers him himself himself how I I'd I'll I'm
        is isn't it it'd it'll it's itself itself just less many me mightn't more
        most much mustn't myself myself no oneself oneself other ours
        ours ourself ourselves ourselves shall shan't she she'd
        she'll she's should shouldn't someone that'll
        that's theirs theirs them themselves themselves therefore they they'd
        they'll they're was wasn't we we'd we'll we're went were weren't who
        whom won't would wouldn't you you'd you'll you're yours yours
        yourselves
    / non-word tokens that do not normally occur in terminology /
        b c d e f g h i j k l m n o p q r s t u v w x y z = *−+/
    allowable_chars:=
        a b c e f g h i j k l m n o p q r s t u v w x y z A B C E F G H I J K L M N O P Q R
        S T U V W X Y Z'.−
```

COMMENTS ON THE PREFERRED EMBODIMENT

The invention is intended to provide both high coverage of a text's technical terminology and high quality of the candidate terms extracted. Trade-offs between quality and coverage occur in several ways. The preferred embodiment generally selects coverage over quality unless quality can be increased with minimal sacrifice in coverage.

The option of accepting prepositions in the candidate string is a parameter, allow_preposition in the pseudocode above; the value of this parameter defaults to true. Few candidates including prepositions normally prove to be genuine terminology. Accepting a preposition in candidate strings provides greater coverage of valid terms; excluding them provides greater quality among candidates.

A word-by-word part-of-speech filter, grammar_constraints, is used, rather than a full parser, to recover candidates that, at least out of context, are consistent with the grammatical constraints. This may result in the production of candidates that, in the context of their actual use in the text, are not in fact consistent with the constraints. For example, contained procedure could be an adjective-noun sequence; this filter would admit it as a candidate, even if it came from a sentence such as: "The program contained procedure calls in which it was actually a verb-noun sequence. However, it also guarantees the highest coverage possible, using a given part-of-speech database, of noun phrases that do meet the grammar constraints, and is more efficient than parsing. Nonetheless, the grammatical constraints could be implemented instead by using an automatic parser.

The preferred sequential embodiment breaks up the text into fragments, before checking for repetition of substrings of the fragments. Fragments are the word strings which satisfy specific properties specified in the glossary. This is accomplished by prohibiting the generation of any fragment containing a word which appears on a stoplist of (mostly) high frequency tokens or which contains non-allowable characters. All substrings of at least two and at most max_length words and that end in a potential full noun are collected from each fragment. (max_length is also a program parameter, which defaults to 5; empirically, very few technical terms have more than 5 words.) The stoplist presented in the preferred implementation includes mainly quantifiers, pronouns, demonstratives, and auxiliary verbs; among them are most of the 150 most frequent words in English. Because of the extremely high overall frequency of these tokens, this yields fragments much shorter than the original sentences, and substantially fewer substrings to text for repetition and for agreement with part-of-speech constraints. The list of allowable characters, allowable_chars, contains upper and lower case alphabetical characters, apostrophe, hyphen, and period. The values of stoplist and allowable_chars may be changed by the implementor to meet particular requirements of the text being processed.

Token are on the stoplist for one of four reasons. (1) Enforcing adjective/noun type: A stoplist provides an efficient way of implementing the restriction of adjectives to full adjectives, excluding quantifiers and determiners, and thereby also the restriction of lexical nouns to full nouns, excluding non-full adjectives used as nouns. This avoids reference to the categories of quantifier and determiner in the procedure. (2) Rare use in allowed part of speech: In order to improve the quality of the candidate list with minimal loss of coverage, the stoplist includes a large number of words that can be, but seldom are, used as full nouns, full adjectives, or prepositions. (3) Frequency alone: Some tokens that are not nouns, adjectives, or prepositions are on the stoplist simply by virtue of their high frequency. Examples include punctuation and certain conjunctions, pronouns, adverbs, and verbs. Although fragments containing such tokens would be eliminated later by the grammar_constraints routine, processing expense is reduced when they are on the stoplist since the number of fragments whose collection is thereby avoided constitute a substantial proportion of the total number of fragments that would otherwise be collected and submitted to the frequency_constraint and grammar_constraints routines. (4) Non-word tokens that are rare in technical terms. These often enter text in variable names, or in fragments of equation, computer programs, and other non-textual data.

Control over minimum frequency is achieved by assigning a value to the parameter min_count, which defaults to 2. Groups of candidate terms of lower frequency have lower quality than groups of candidate terms of higher frequency; and the most frequent candidate strings recovered from technical text are almost always valid technical terms. Particularly for longer documents, minimum frequencies greater than 2 normally will substantially increase quality. However, there is a definite loss of coverage associated with raising the minimum frequency parameter min_count. Alternatively, lower frequency strings may be subjected to further quality constraints than are the higher frequency candidates. Incidentally, sorting candidate strings by frequency permits presentation in "best-first" order, in the sense that the quality of the list is higher toward the beginning than toward the end. The program paramater lemmatize defaults to false. Some terms occur in a text in both singular and plural forms; under the grammatical constraints of the algorithm, these terms are taken to differ only in the grammatical number of the final noun of the term. If neither the singular nor plural forms occur at least min_count times and lemmatize is false, such terms are not recovered by the algorithm, even if the singular and plural forms together do satisfy the frequency constraint. These candidates are retrieved if lemmatize is passed to the program as true. Processing takes place at the beginning of the substrings procedure. The final word of each substring of the text fragment is checked to assure that it is a noun (thus, part of the grammatical constraints are handled in substrings are not in grammar_constraints); if so, then that noun is replaced by its singular form in the substring, and the lemmatized substring is then written to the output list of substrings. The frequency constraint and the remaining grammatical constraints are then applied to an already lemmatized lists of strings. If the allow_preposition parameter is passed as true, this implementation of lemmatization is a simple and efficient approximation, rather than an exact implementation. In terms containing prepositions, usually the last noun preceding the preposition should be lemmatized, whether or not the last noun in the string is lemmatized. Thus, when two candidate strings occur with frequency one, and differ from one another only in that the noun before the preposition is in the singular in one candidate and in the plural in the other candidate, the lemmatized form of the string has a frequency of 2 1 and is a viable candidate (assuming min_count=2). In the current implementation, however, there is no check for prepositions until the frequency constraint has been applied, so the string is not retrieved. The approximation provides adequate coverage, since the proportion of valid candidates containing prepositions is relatively low, and only a small proportion of even these cases will occur exactly once in the singular and once in the plural. If desired, these cases could be recovered by implementing lemmatization in a more complex or less efficient way.

In case non-textual data occurs in the file, performance of the algorithm will be improved by preprocessing the file to remove such data, and applying the above procedure to the processed file.

The invention can be implemented on any modern sequential or parallel computer machinery, including but not limited to personal computers, workstations, minicomputers, mainframes, and supercomputers.

GLOSSARY allowable characters—Characters that are allowed to occur in the candidate multi-word terms to be extracted from the text file.

candidate list—The output of the terminology identification mechanism. The candidate list consists of word strings. The candidate list is intended to be of high quality and to have high coverage.

candidate string, candidate term—A word string in the candidate list.

coverage—The proportion of those technical terms in the text which are among the candidate terms.

fragment—A fragment is a sequence of tokens in a text file. The first token in a fragment is either the first token in the sentence or it immediately follows a token on a stoplist, or it immediately follows a token containing a character not among the allowable characters. The last token of a fragment is either the last token of the text file, or it immediately precedes a token on a stoplist, or it immediately precedes a token containing a character not among the allowable characters. A fragment contains no token on a stoplist, and each token in a fragment contains only allowable characters. Any technical term in the text must be contained entirely within a fragment.

frequency—The number of times a substring/word string appears in a file.

frequency constraint—A condition that a substring must appear more than some minimum number of times in the input text in order to become a candidate term.

full adjective—An adjective which is not a quantifier or determiner. Adjectives that are not full adjectives appear on a stoplist.

full noun—A noun which is not a pronoun nor a non-full adjective used as a noun. Nouns that are not full nouns appear on a stoplist.

grammatical constraint—A condition, on substrings, that requires selected parts of speech in selected positions. Word strings not meeting this condition do not become candidate strings.

high frequency word—A word which occurs frequently in English. Such words are unlikely to occur in technical terms.

lemmatize—To extract the morphological base of an inflected word by removing inflection affixes or by looking up the base of an irregular inflected form. A plural noun is lemmatized by producing its singular form.

multi-work technical term—A technical term which consists of two or more words.

potential full adjective—An instance of a word, which word is used in some contexts as a full adjective, whether or not said instance is itself used as an adjective.

potential full noun—An instance of a word, which word is used in some contexts as a full noun, whether or not said instance is itself used as a noun. Words which do not appear in the part-of-speech dictionary are assumed to be potential full nouns.

potential preposition—An instance of a word, which word is used in some contexts as a preposition, whether or not said instance as itself used as a preposition.

quality—The proportion of candidate terms produced by the procedure that are actually technical terms.

stoplist—A list of tokens which are assumed not to occur in technical terminology. Typical members of a stoplist are (1) frequency words which are not (or are only rarely) nouns, adjective, or prepositions, (2) nouns which are not full nouns and adjectives which are not full adjectives, and (3) tokens which occur in texts but which are not words.

string—A sequence of tokens.

substring—A word string which is contained within a fragment. Substrings are submitted to a frequency constraint and grammatical constraints in order to determine if they will be included in the set of candidate terms.

technical term—A sequence of one or more words that has a particular meaning in some technical domain.

terminology—The set of technical terms in a text from a particular technical domain.

text file—A computer file containing natural language text.

token—A sequence of text characters delimited by blanks and/or punctuation.

token constraint—A condition, on substrings, that every token in the substring contains only characters that are allowable characters, and that no token in the substring appears on the stoplist.

word—A token considered to be part of a natural language. Punctuation, numbers, mathematical expressions, etc. are not words.

word string—A sequence of one or more words.

Having thus described our invention, what we claim as new and desire to secure by Letters Patents is:

1. Programmed computer apparatus for extracting a list of candidate multi-word technical terms from an input text file, a multi-word technical term being a string of at least two words having a particular meaning in some technical field, said apparatus comprising:

means for storing a stoplist of tokens which are assumed to not occur in multi-word technical terms, a token being a word, character or string of characters delimited by blanks and/or punctuation;

means for storing a maximum length parameter specifying a maximum number of tokens in any candidate multi-word technical term to be extracted;

means responsive to the stored stoplist for extracting text fragments from an input text file by identifying delimiting tokens in the input text file, including means for identifying as a delimiting token each token in the input text file which is the same as a token in the stored stoplist, the identified delimiting tokens defining text fragments therebetween;

means for deriving from the extracted text fragments all possible subsequences of tokens having a length of at least two tokens and not more than a maximum number of tokens specified by the stored maximum length parameter;

means for testing each of the derived subsequences against at least one filtering condition; and means for creating a sublist of the derived subsequences which pass the at least one filtering condition, the created sublist being the list of candidate multi-word technical terms.

2. Programmed computer apparatus as defined in claim 1 and further comprising means for storing a list of allowable characters for candidate multi-word technical terms to be extracted, said means for extracting text fragments including means for identifying as a delimiting token each token in the input text file which contains at least one character not in the stored list of allowable characters.

3. Programmed computer apparatus as defined in claim 2 wherein said means for testing comprises:

means for storing a frequency parameter specifying a minimum frequency of occurrence for a candidate multi-word technical term to be extracted; and means for using as a filtering condition that a derived subsequences being tested occurs in the input text file with a frequency not less than specified by the stored frequency parameter.

4. Programmed computer apparatus as defined in claim 3 wherein a filtering condition against which each of the derived subsequences is tested by said testing means is a grammatical constraint.

5. Programmed computer apparatus as defined in claim 4 and further comprising a dictionary of words for identifying potential parts of speech for each word in the dictionary, any word not in said dictionary being considered a potential full noun, and wherein said grammatical constraint is that words at particular positions in a derived subsequence being tested potentially are specified parts of speech.

6. Programmed computer apparatus as defined in claim 5 wherein said grammatical constraint is that a derived subsequence being tested satisfies the following conditions:

the last word is a potential full noun;

the first word is a potential full noun or potential full adjective;

any intermediate word in a potential full noun, a potential full adjective or a potential preposition; and any intermediate word that is a potential preposition and not also either a potential full noun or a potential full adjective is preceded by a word that is a potential full noun.

7. Programmed computer apparatus as defined in claim 1 wherein said means for testing comprises:

a dictionary of words for identifying potential parts of speech for each word in the dictionary, any word not in said dictionary being considered a potential noun; and means responsive to said dictionary for using as a filtering condition whether a derived subsequence being tested includes a potential noun as a last token.

8. Programmed computer apparatus as defined in claim 1 wherein a filtering condition against which each of the derived subsequences is tested by said testing means is a grammatical constraint.

9. Programmed computer apparatus as defined in claim 8 and further comprising a dictionary of words for identifying potential parts of speech for each word in the dictionary, any word not in said dictionary being considered a potential full noun, and wherein said grammatical constraint is that words at particular positions in a derived subsequence being tested potentially are specified parts of speech.

10. Programmed computer apparatus as defined in claim 9 wherein said grammatical constraint is that a derived subsequence being tested satisfies the following conditions:

the last word is a potential full noun;

the first word is a potential full noun or potential full adjective;

an intermediate word is a potential full noun, a potential full adjective or a potential preposition; and any intermediate word that is a potential preposition and not also either a potential full noun or a potential full adjective is preceded by a word that is a potential full noun.

11. Programmed computer apparatus for extracting a list of candidate multi-word technical terms from an input text file, a multi-word technical term being a string of at least two words having a particular meaning in some technical field, said apparatus comprising:

means for storing a stoplist of tokens which are assumed to not occur in multi-word technical terms, a token being a word, character or string of characters delimited by blanks and/or punctuation;

means for storing a frequency parameter specifying a minimum frequency of occurrence for a candidate multi-word technical term to be extracted;

means responsive to the stored stoplist for extracting text fragments from an input text file by identifying delimiting tokens in the input text file, including means for identifying as a delimiting token each token in the input text file which is the same as a token in the stored stoplist, the identified delimiting tokens defining text fragments therebetween;

means for deriving from the extracted text fragments each possible subsequence of tokens having a length of at least two tokens and which occurs in the input text file with a frequency not less than specified by the stored frequency parameter;

means for testing each of the derived subsequences against at least one filtering condition; and means for creating a sublist of the derived subsequences which pass the at least one filtering condition, the created sublist being the list of candidate multi-word technical terms.

12. Programmed computer apparatus as defined in claim 11 and further comprising means for storing a list of allowable characters for candidate multi-word technical terms to be extracted, said means for extracting text fragments including means for identifying as a delimiting token each token in the input text file which contains at least one character not in the stored list of allowable characters.

13. Programmed computer apparatus as defined in claim 11 wherein said means for testing comprises:

means for storing a maximum length parameter specifying a maximum number of token in any candidate multi-word technical term to be extracted; and means for using as a filtering condition whether a derived subsequence being tested has a length which does not exceed the length specified by the stored maximum length parameter.

14. Programmed computer apparatus as defined in claim 11 wherein a filtering condition against which each of the derived subsequences is tested by said testing means is a grammatical constraint.

15. Programmed computer apparatus as defined in claim 14 and further comprising a dictionary of words for identifying potential parts of speech for each word in the dictionary, any word not in said dictionary being considered a potential full noun, and wherein said grammatical constraint is that words at particular positions in a derived subsequence being tested potentially are specified parts of speech.

16. Programmed computer apparatus as defined in claim 15 wherein said grammatical constraints is that a derived subsequence being tested satisfies the following conditions:
  the last word is a potential full noun;
  the first word is a potential full noun or potential full adjective;
  any intermediate word is a potential full noun, a potential full adjective or a potential preposition; and
  any intermediate word that is a potential preposition and not also either a potential full noun or a potential full adjective is preceded by a word that is a potential full noun.

17. A computer implemented method of extracting a list of candidate multi-word technical terms from an input text file, a multi-word technical term being a string of at least two words having a particular meaning in some technical field, said method comprising the computer implemented steps of:
  storing a stoplist of tokens which are assumed to not occur in multi-word technical terms, a token being a word, character or string of characters delimited by blanks and/or punctuation;
  storing a maximum length parameter specifying a maximum number of token in any candidate multi-word technical term to be extracted;
  extracting text fragments from an input text file by identifying delimiting tokens in the input text file at least in part by identifying as a delimiting token each token in the input text file which is the same as a token in the stored stoplist, the identified delimiting tokens defining text fragments therebetween;
  deriving from the extracted text fragments all possible subsequences of tokens having a length of at least two tokens and no more than a maximum number of tokens specified by the stored maximum length parameter;
  testing each of the derived subsequences against at least one filtering condition; and
  creating a sublist of the derived subsequences which pass the at least one filtering condition, the created sublist being the list of candidate multi-word technical terms.

18. A computer implemented method as defined in claim 17 and further comprising the steps of storing a list of allowable characters for candidate multi-word technical terms to be extracted, and in the step of extracting text fragments, identifying as a delimiting token each token in the input text file which contains at least one character not in the stored list of allowable characters.

19. A computer implemented method as defined in claim 18 wherein the testing step further comprises the steps of:
  storing a frequency parameter specifying a minimum frequency of occurrence for a candidate multi-word technical term to be extracted; and
  using as a filtering condition in the testing step whether a derived subsequence being tested occurs in the input text file with a frequency not less than specified by the stored frequency parameter.

20. A computer implemented method as defined in claim 17 wherein the testing step further comprises the steps of:
  storing a frequency parameter specifying a minimum frequency of occurrence for a candidate multi-word technical term to be extracted; and
  using as a filtering condition in the testing step whether a derived subsequence being tested occurs in the input text file with a frequency not less than specified by the stored frequency parameter.

21. A computer implemented method as defined in claim 17 wherein the testing step includes the step of testing each of the derived subsequences against a grammatical constraint filtering condition.

22. A computer implemented method as defined in claim 21 and further comprising the step of storing a dictionary of words identifying potential parts of speech for each word in the dictionary, any word not in said dictionary being considered a potential full noun, and wherein the step of testing each derived subsequence against a grammatical constraint includes the step of determining whether words at particular positions in a derived subsequence being tested potentially are specified parts of speech.

23. Apparatus as defined in claim 22 wherein said step of testing each derived subsequence against a grammatical constraint includes the step of determining whether a derived subsequence being tested satisfies the following conditions:
  the last word is a potential full noun;
  the first word is a potential full noun or potential full adjective;
  any intermediate word is a potential full noun, a potential full adjective or a potential preposition; and
  any intermediate word that is a potential preposition and not also either a potential full noun or a potential full adjective is preceded by a word that is a potential full noun.

24. A computer implemented method as defined in claim 17 wherein the testing step further comprises the steps of:
  storing a dictionary identifying potential parts of speech for each word in the dictionary, any word not in said dictionary being considered a potential noun; and
  using as a filtering condition whether a derived subsequence being tested includes a potential noun as a last token by finding potential parts of speech for the last token in the stored dictionary.

25. A computer implemented method of extracting a list of candidate multi-word technical terms from an input text file, a multi-word technical term being a string of at least two words having a particular meaning in some technical field, said method comprising the computer implemented steps of:
  storing a stoplist of tokens which are assumed to not occur in multi-word technical terms, a token being a word, character of string of characters delimited by blanks and/or punctuation;

storing a frequency parameter specifying a minimum frequency of occurrence for a candidate multi-word technical term to be extracted;

extracting test fragments from an input text file by identifying delimiting tokens in the input text file at least in part by identifying as a delimiting token each token in the input text file which is the same as a token in the stored stoplist, the identified delimiting tokens defining text fragments therebetween;

deriving from the extracted text fragments all possible subsequences of tokens having a length of at least two tokens and which occur in the input text file with a frequency not less than specified by the stored frequency parameter;

testing each of the derived subsequences against at least one filtering condition; and creating a sublist of the derived subsequences which pass the at least one filtering condition, the created sublist being the list of candidate multi-word technical terms.

26. A computer implemented method as defined in claim 25 and further comprising the steps of storing a list of allowable characters for candidate multi-word technical terms to be extracted, and in the step of extracting text fragments, identifying as a delimiting token each token in the input text file which contains at least one character not in the stored list of allowable characters.

27. A computer implemented method as defined in claim 26 wherein the testing step includes the step of testing each of the derived subsequences against a grammatical constraint filtering condition.

28. A computer implemented method as defined in claim 25 wherein the testing step includes the step of testing each of the derived subsequences against a grammatical constraint filtering condition.

* * * * *